United States Patent
Tu

[19]

[11] Patent Number: 6,139,758
[45] Date of Patent: Oct. 31, 2000

[54] METHOD OF MANUFACTURING A MICROMACHINED THERMAL FLOWMETER

[75] Inventor: Xiangzheng Tu, Beijing, China

[73] Assignee: Enlite Laboratories, Inc., Taipei, Taiwan

[21] Appl. No.: 09/182,484

[22] Filed: Oct. 30, 1998

Related U.S. Application Data

[62] Division of application No. 08/916,924, Aug. 22, 1997, abandoned.

[30] Foreign Application Priority Data

Aug. 23, 1996 [CN] China .................. 96109521.0

[51] Int. Cl.⁷ .................. G01F 1/68; H01L 21/306
[52] U.S. Cl. .................. 216/2; 216/99; 438/54; 205/656
[58] Field of Search .................. 216/2, 99; 205/656, 205/665; 438/54; 73/204.24, 204.25, 204.26

[56] References Cited

U.S. PATENT DOCUMENTS

| | | | |
|---|---|---|---|
| 4,633,578 | 1/1987 | Aine et al. | 29/612 |
| 4,696,188 | 9/1987 | Higashi | 73/204 |
| 4,784,721 | 11/1988 | Holmen et al. | 216/2 |
| 5,251,481 | 10/1993 | Huck et al. | 73/204.26 |
| 5,263,380 | 11/1993 | Sultan et al. | 73/204.26 |
| 5,313,832 | 5/1994 | Stephan et al. | 73/204.26 |
| 5,445,991 | 8/1995 | Lee | 216/2 |
| 5,565,084 | 10/1996 | Lee et al. | 205/646 |
| 5,620,929 | 4/1997 | Hosoi et al. | 216/2 |
| 5,801,070 | 9/1998 | Zanini-Fisher et al. | 216/2 |
| 5,804,720 | 9/1998 | Morimasa et al. | 73/204.26 |
| 5,830,372 | 11/1998 | Hierold | 216/2 |
| 5,868,947 | 2/1999 | Sakaguchi et al. | 216/2 |
| 5,968,336 | 10/1999 | Rolfson | 205/656 |
| 6,004,450 | 12/1999 | Northrup et al. | 205/656 |

*Primary Examiner*—Randy Gulakowski
*Assistant Examiner*—Anita Alanko
*Attorney, Agent, or Firm*—Rosenberg, Klein & Lee

[57] ABSTRACT

A method of manufacturing a micromachined thermal flowmeter is provided. The major manufacturing steps comprise forming an n-type region(s) in a p-type silicon wafer, forming heating and temperature sensing devices in the n-type region(s), converting the n-type region(s) into porous silicon by anodization in a HF solution, bonding the silicon wafer onto a glass plate using a polyimide layer as an adhesive layer, removing the porous silicon in a diluted base solution, and coating the heating and temperature sensing devices with a corrosion-resistant and abrasion-resistant material.

10 Claims, 6 Drawing Sheets

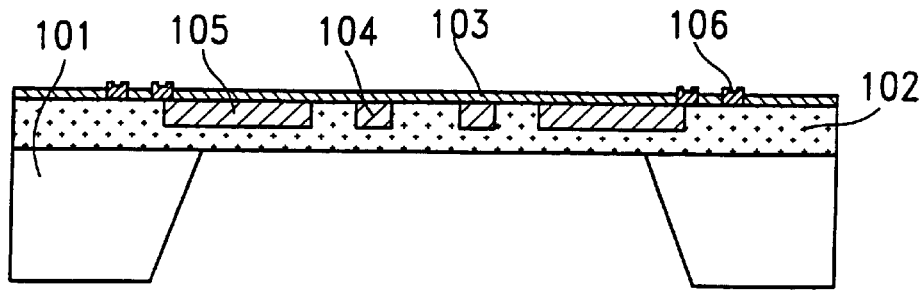
PRIOR ART
FIG. 1
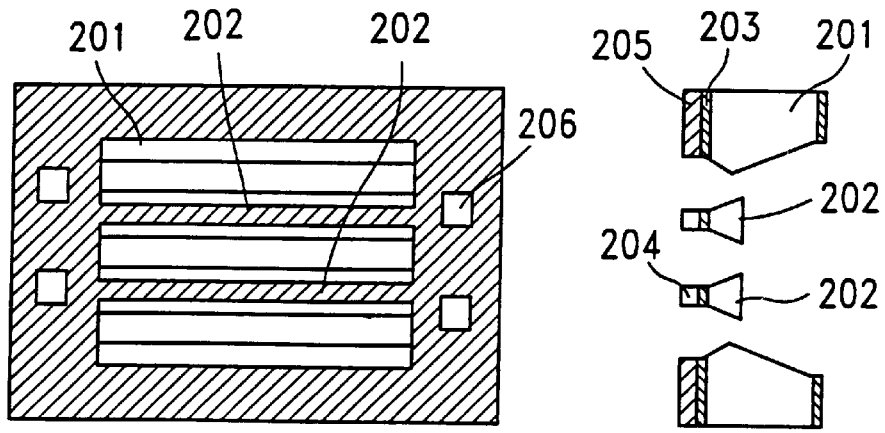
PRIOR ART
FIG. 2A
PRIOR ART
FIG. 2B
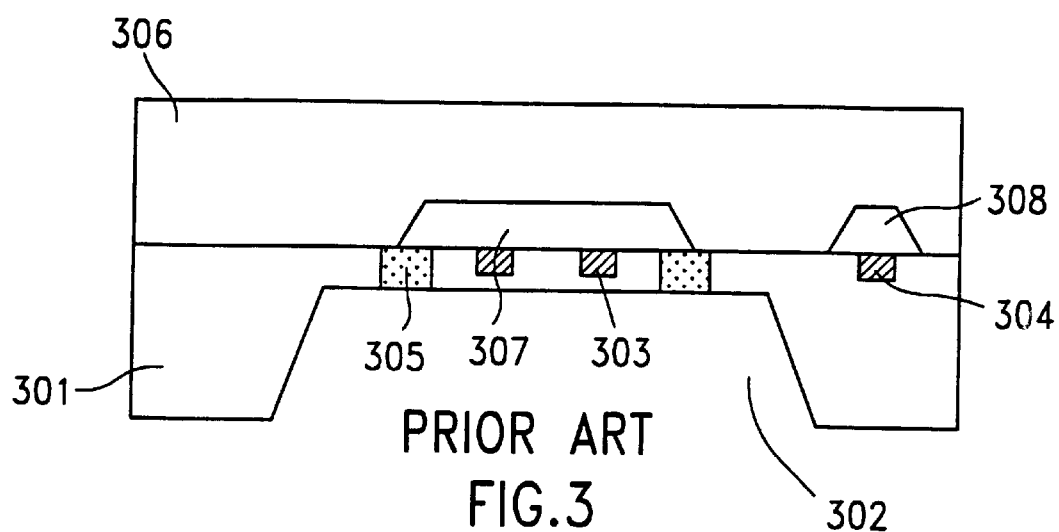
PRIOR ART
FIG. 3

METHOD OF MANUFACTURING A MICROMACHINED THERMAL FLOWMETER

This application is a divisional of application Ser. No. 08/916,924 filed on Aug. 22, 1997, now abandoned.

BACKGROUND OF THE INVENTION

1. Field of the Invention

The invention relates to micromachined thermal flowmeters for measuring the flow rate of a flowing fluid, e.g., a liquid or a gas.

2. Description of the Prior Art

In general, a micromachined thermal flow meter is operated based on the principle of a well-known, hot-wire anemometer and fabricate by using modern silicon integrated circuit (IC) technology. Such a flowmeter offers many advantages including small size, low input power, high sensitivity, fast response, ability for integration, and easiness for batch production. The flowmeters have found an ever-increasing variety of applications such as, for instance, process control in the chemical or semiconductor industries, air conditioning and building control, combustion control in engines and furnaces, and medical measurements.

Over the last ten years several types of the micromachined thermal flowmeters have been developed.

In the first type, a thermopile gas flowmeter uses a thin single crystal membrane structure micromachined in a silicon substrate for providing high thermal isolation, as shown FIG. 1. A heating resistor (104) is disposed in the central region of the membrane (102). A thermopile consists of 20 aluminum/polysilicon thermocouples (105) placed on the membrane (102). The "hot" contacts are positioned near the heating resistor (104) at the tip of the membrane (102), the "cold" contacts are located on the bulk silicon (101). The flowmeter also comprises a passivation layer (103) and a metallization pattern including bonding pads (106).

This type of flowmeters suffers the following problems:
(1) The thin membrane of the flowmeter is easy to damage under the conditions of higher air flow loading and bombardment of particulate matter.
(2) The fluid flow to be measured is easy to be disturbed by the opening on the surface of the membrane adapted to allow the fluid passing over.
(3) The flowmeter can not be used for liquid because the liquid filled in the opening would reduce the thermal resistance between the cantilever beam and the bulk silicon.
(4) The flowmeter can not be used in corrosion environment, because the back side of the thin membrane has no protecting layer thereon.

In the second type, a flowmeter has an air flow opening micromachined in a silicon substrate (201) by anisotropic chemical etching, and bridged by two beams (202), as shown in FIGS. 2A, 2B. Each bean has a nickel film resistor (204) along its length, electrically isolated from the underlying silicon by a $SiO_2$ layer (203) and passivated by a $Si_3N_4$ layer (205), but thermally closely coupled to it. Aluminum leads make contact with these resistors and connect to four bonding pads (206) on one edge of the chip. One beam (202) is heated via its resistor by means of a control circuit. The other beam (202) is unheated and serves as an ambient-temperature reference for temperature compensation. this type of flowmeters, the above mentioned problems (2), (3) and (4) remain to be solved. In addition, large cross-section area of the beams degrades the performance of the flowmeters such as sensitivity and response time.

In third type, a flowmeter, as shown in FIG. 3, is made of a silicon substrate (301) having a central circular region and an outre annular region on one side and a cap (306) having two cavities (307) and (308). A heating element (303) is disposed in the central circular region and at least one thermometer component (304) is disposed in the outer annular region of the silicon substrate (301). The two regions are insulated from each other by a ring region of oxidized porous silicon (305). The flowmeter is adapted to receive the flow of fluid over side of the substrate which has a micromachined cavity (302).

This type of flowmeters also has several problems.

Firstly, the manufacturing process of the flowmeters involves two substrate-processing and then bonding the two substrates together with specific alignment and bonding tools. This complicated process increases cost greatly.

Secondly, the oxidized porous silicon has thermal expansion characteristics that are different from the silicon. Due to the thermal stress, the devices disposed near the oxidized porous silicon are easy to degrade if the change in the operation temperature is too large.

Thirdly, the recesses of the cap substrate prevent the device substrate from thinning out to a small thickness. If the thickness of the device substrate is less than the depth of oxidized porous silicon region, the lateral thermal isolation between the central region and the outer annular region can not be realized very well.

Fourthly, since the cap substrate covers the front surface of the device substrate, it is difficult to adapt an electrical connection to the external circuit.

SUMMARY OF THE INVENTION

An object of the present invention is to provide a micromachined thermal flowmeter in which the heating element and the temperature sensing element are formed in thin crystal silicon islands that are embodied in an elastic thermal isolating blanket that is supported by a rigid thermal isolating plate to achieve higher sensitivity, faster response, lower input power, and more robust structure.

Another object of the present is to provide a micromachined thermal flowmeter in which the heating element and the temperature sensing element do not contact with the fluid to be measured in order to avoid them suffering problems of abrasion, corrosion, and contamination.

Still another object of the present invention is to provide a micromachined thermal flowmeter in which the fluid to be measured flows over a flat surface without any recesses in it in order to avoid disturbing the flow.

Still another object of the present invention is to provide a micromachined thermal flowmeter in which the surface faced with the fluid to be measured can be coated with a corrosion-resistant and abrasion-resistant layer in order to prolong the period of the operation of the flowmeter.

Still another object of the present invention is to provide a micromachined thermal flowmeter that can be fabricated by using standard integrated circuit technology with a small modification to achieve high cost-effectiveness.

The above and other objects are achieved by a micromachined thermal flowmeter in accordance with the present invention.

BRIEF DESCRIPTION OF THE DRAWINGS

FIG. 1 is a cross-sectional view of a first conventional micromachined thermal flowmeter.

FIG. 2A is a top plan view of a second conventional micromachined thermal flowmeter.

FIG. 2B is a cross-sectional view of the micromachined thermal flowmeter of FIG. 2A.

FIG. 3 is a cross-sectional view of a third conventional micromachined thermal flowmeter.

DETAILED DESCRIPTION OF THE PREFERRED EMBODIMENT

Figure 4A:
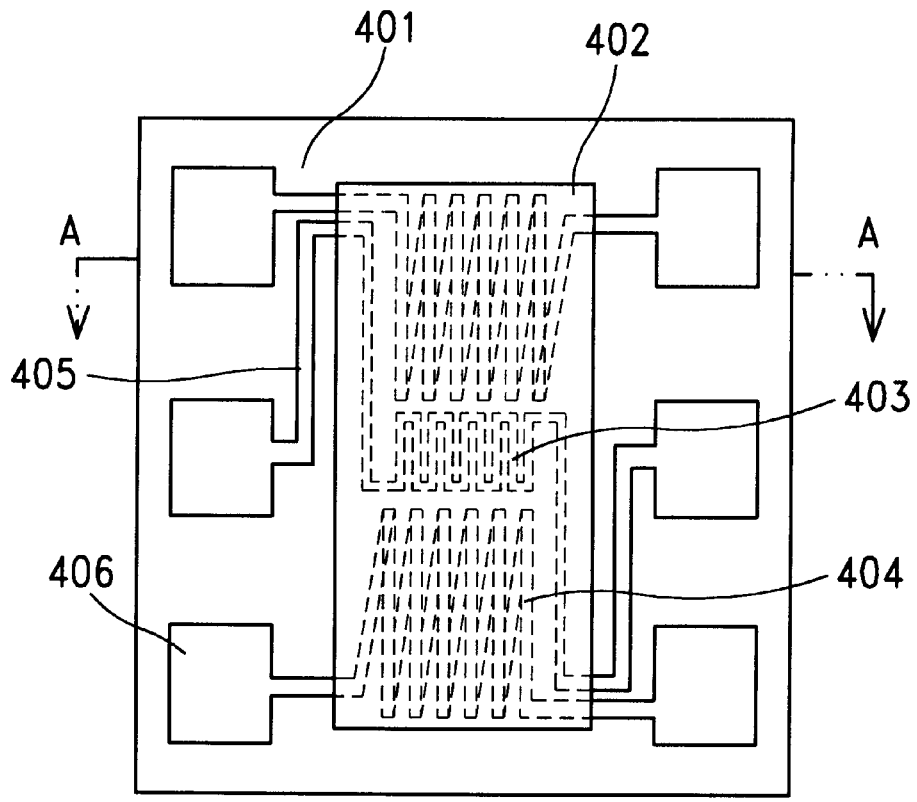
FIG. 4A is a top plan view of a first embodiment of the micromachined thermal flow meter according to the present invention.
Figure 4B:
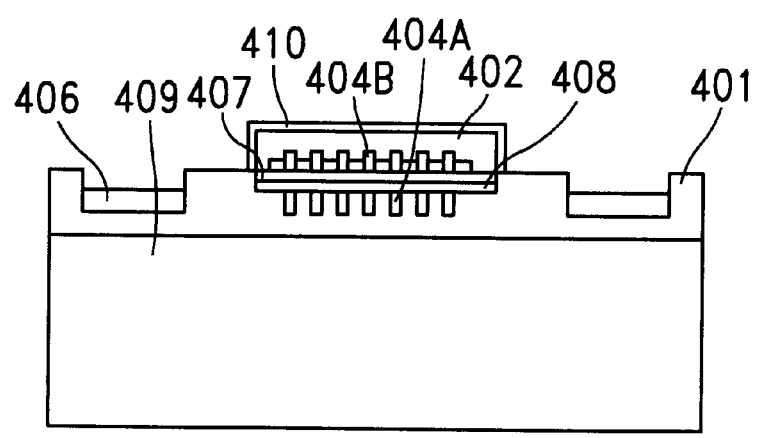
FIG. 4B is a cross-sectional view of the micromachined thermal flowmeter of FIG. 4A.

Referring to FIGS. 4A and 4B, a preferable embodiment of a micromachined thermal flowmeter, according to the present invention, comprises a thin rectangular single crystal silicon island (402), a polyimide layer (401) in which the silicon island (402) is embedded, and a glass plate (409) supporting the polyimide layer (401). On one side of the silicon island (402) which faces the polyimide layer (401) there are a heating resistor (403) disposed in its central region and two thermopiles (404) symmetrically disposed in its side regions. The heating resistor (403) and the thermopiles (404) are electrically connected to the external circuit through metal stripes (405) and metal pads (406). The thermopile (404) consists of semiconductor electrodes (404A), metal electrodes (404B), and the insulating layers (407) and (408). A larger part of the metal stripes (405) and the metal pads (406) are inlaid to the polyimide layer (4010). On the other side of the silicon island (402) which faces the fluid to be measured there is a silicon nitride layer (410) used to protect the surface from damage by the fluid.

When the flowmeter provided by the present invention is in use, the central region of the silicon island is heated and maintained at a constant temperature. A fluid to be measured is allowed to pass over the back side of the silicon island, increasing the convection heat flow and the input power required to maintain the central region temperature. This increased electrical drive is used to indicate the flow velocity of the fluid.

The flow sensitivity is dependent on the no-flow steady-state heat dissipation and the flow-related heat dissipation. The no-flow steady-state heat dissipation can be made small through the following ways.

(1) The silicon island can be fabricated as thin as 2–3 $\mu$m-thick to provide very high lateral thermal resistance.

(2) The thermal conduction co-efficient of polyimide, glass, and silicon are 0.17 W/m.k., 1.4 W/m.k., and 150 W/m.k., respectively. Both the polyimide and the glass are much less than the silicon. The thermal resistance from the heating resistor to the supporting plate is much lower than that from the heating resistor to the fluid and therefore the flow sensitivity of the flowmeter is mainly dependent of the velocity of the fluid.

Referring now to the drawings, from FIG. 5 to FIG. 14, there are cross-sectional views showing a method for fabricating a micromachined thermal flowmeter according to the first embodiment of the present invention.

Figure 5:
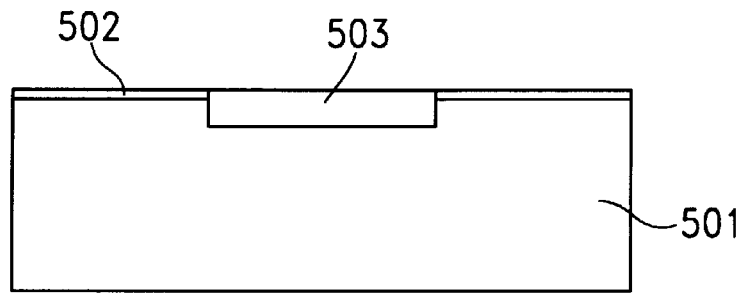
FIG. 5 is a cross-sectional view showing an n-type region formed in a p-type silicon wafer for manufacturing.

In FIG. 5, a single side polished, crystalline plane (100) oriented p-type silicon wafer (501) with a resistivity of about 1 Ω-cm is provided. A 6500 Å-thick $SiO_2$ layer (502) is grown on the surface of the wafer (501) by thermal oxidation in wet $O_2$ at 1000° C. Ion implantation windows are formed in the $SiO_2$ layer (502) by a first photoresist process. Another 700 Å-thick $SiO_2$ layer (not shown in the FIG. 50 is grown in the window regions by thermal oxidation in wet $O_2$ at 1000° C. Phosphorus ion implantation is performed at energy 100 kev with dose $3-4\times10^{13}/cm^2$. Drive-in is performed by dry $N_2$ at 1200° C., resulting in a n-type region (503) having a junction depth of about 6 $\mu$m and a sheet resistance of about 2–3 k Ω/□.

Figure 6:
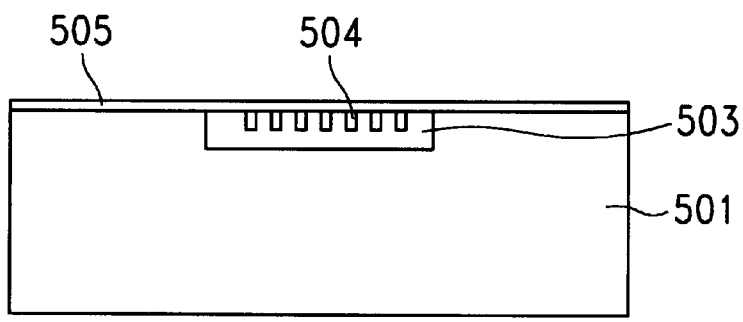
FIG. 6 is a cross-sectional view showing a plurality of $p^+$-type regions formed in the n-type region of the silicon wafer for manufacturing a micromachined thermal flowmeter.

In FIG. 6, all the residual $SiO_2$ on the surface of the wafer (501) is removed by etching in a mixture of $NH_4F$ (40% in water):HF (49% in water):$H_2O$=1:8:6. An ion implantation pattern is formed by a second photoresist process. Using the photoresist pattern as a mask, boron ion implantation is performed at an energy of 100 kev with a dose of $10^{15}/cm_2$. Drive-in is performed in dry $N_2$ at 950° C., resulting in $p^+$-type regions (504) having a sheet resistance of about 90 Ω/□ in the n-type region (503) which are used as semiconductor electrodes of thermopiles. Then 700 Å-thick $SiO_2$ layer (550) is grown on the surface of the wafer (501) by thermal oxidation in wet $O_2$ at 1000° C.

Figure 7:
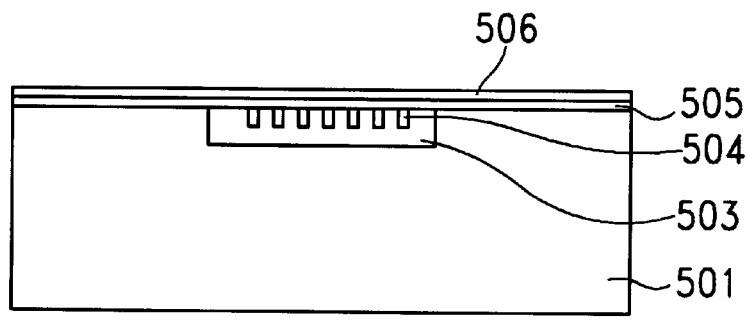
FIG. 7 is a cross-sectional view showing a HF-resistant layer formed on the surface of the silicon wafer for manufacturing a micromachined thermal flowmeter.

In FIG. 7, a 1500 Å-thick $Si_3N_4$ layer (506) is deposited on the surface of the wafer (501) by chemical vapor deposition (CVD) at 750° C. This $Si_3N_4$ layer is designed to be a passivation, etching stop, and HF-resistant layer.

Figure 8:
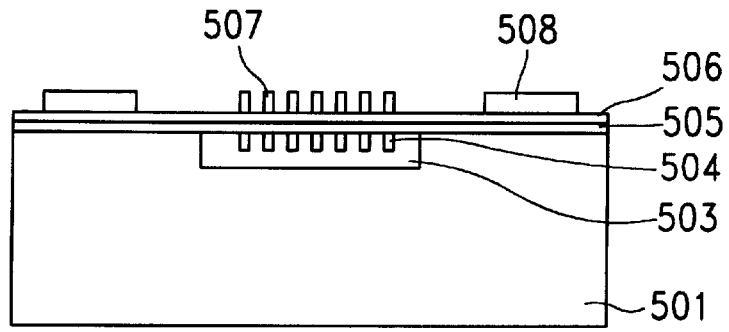
FIG. 8 is a cross-sectional view showing a plurality of aluminum electrodes formed on the surface of the n-type region of the silicon wafer for manufacturing a micromachined thermal flowmeter.

In FIG. 8, contact holes (not shown in FIG. 8) are formed in the $Si_3N_4$ layer (506) and the $SiO_2$ layer (505) by a third photoresist process. A 1.2 $\mu$m-thick Al layer is formed on the surface of the wafer (501) by electron beam evaporation. A pattern is formed in the Al layer by a fourth photoresist process, resulting in interconnection stripes (not shown in FIG. 8), bonding pads (508), and the metal electrodes (507) of the thermopiles. Then annealing is performed in dry $N_2$ at 450° C.

Figure 9:
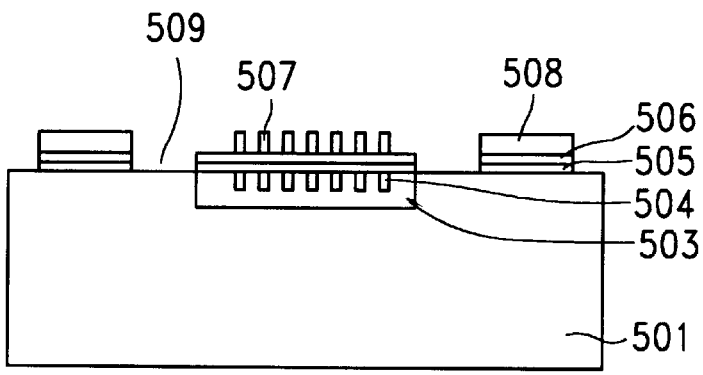
FIG. 9 is a cross-sectional view showing residual $Si_3N_4$ and $SiO_2$ removed from the surface of the silicon wafer for manufacturing a micromachined thermal flowmeter.

In FIG. 9, a fifth photoresist process is performed to remove all of the residual $Si_3N_4$ and $SiO_2$, except for those on the surface of the interconnecting stripes, on the surface of the pads (508), and on the top of the n-type region (503). After this photoresist process, windows (509) are formed in the $Si_3N_4$ (505) and $SiO_2$ (506) composite layer.

Figure 10:
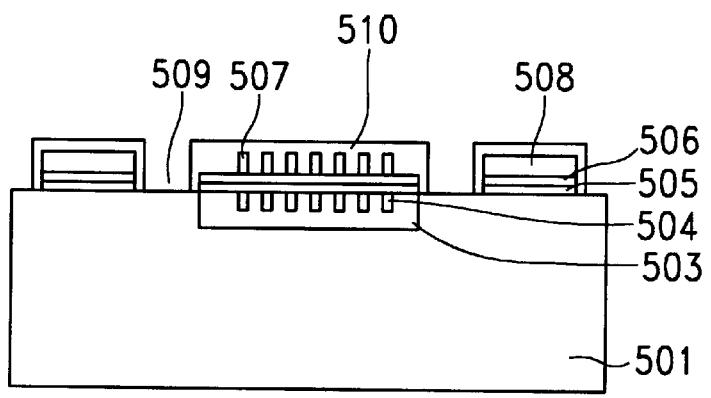
FIG. 10 is a cross-sectional view showing an anodization mask formed on the surface of the silicon wafer for manufacturing a micromachined thermal flowmeter.

In FIG. 10, an anodization mask (510) is formed on the surface of the wafer (501). The anodization mask can be made of polyimide, Au/Cr, Ni/Cr, Cu/Cr, and other HF-resistant materials. Polyimide is preferably used as an anodization mask material and spin-coated on the surface of the wafer (501) at 4 k rpm for 30s to form a polyimide layer. The polyimide layer is soft-baked for 30 min at 135° C. and cured for 1 h at 400° C. A sixth photoresist process is performed to form a photoresist pattern (not shown in FIG. 100. Using the photoresist pattern as a mask, the unwanted polyimide layer is selectively removed by $O_2$ plasma etching, the unwanted $Si_3N_4$ layer is selectively removed by etching in the mixture of $NH_4F$ (40% in water):HF (49% in water):$H_2O$=1:8:6. After these processes, the polyimide mask (510) is finally formed.

Figure 11:
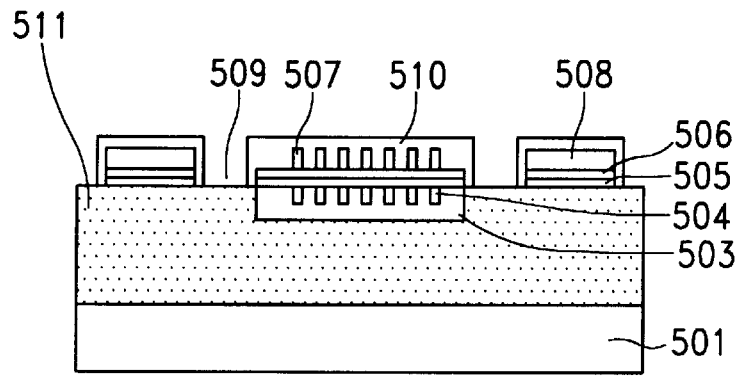
FIG. 11 is a cross-sectional view showing a porous silicon layer formed in the silicon wafer for manufacturing a micromachined thermal flowmeter.

In FIG. 11, anodization is performed in a concentrated HF solution to form a porous silicon layer (511) in the wafer (501). The required anodic voltage for forming porous silicon in n-type silicon is higher than the required anodic voltage for forming porous silicon in p-type silicon. Therefore, porous silicon can be selectively formed in the p-type regions of the n-type silicon wafer by controlling the anodic voltage. The p-type silicon under the n-type region (503) and metal pads (508) can be converted into porous silicon because of the lateral spread effect of the anodic current. The lateral spread effect is dependent on the resistivity of the silicon wafer used. For a p-type silicon wafer with a resistivity of 1 Ω-cm a 40–80 μm-wide lateral spread region can be formed. A HF solution that is used is a mixture of 25% HF, 25% $H_2O$, and 50% $C_2H_5OH$ and an anodic current that is used is 50 mA/cm2. Under these conditions, a formed porous silicon layer (511) is about 50 μm-thick.

Figure 12:
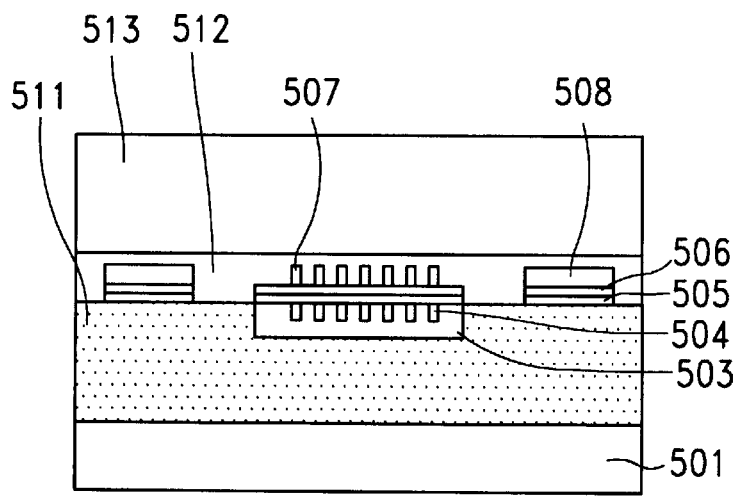
FIG. 12 is a cross-sectional view showing a glass plate mounted on the surface of the silicon wafer for manufacturing a micromachined thermal flowmeter.

In FIG. 12, all the residual polyimide is removed by $O_2$ plasma etching. A new 5–10 μm-thick polyimide layer (512) is formed on the surface of the wafer (501). A 200 μm-thick microcrystalline glass plate (513) is mounted on the surface of the wafer (501) using the polyimide layer (512) as an adhesion layer. Then the wafer (501) is heated to 350° C. for 2 h to cure the polyimide layer (512).

Figure 13:
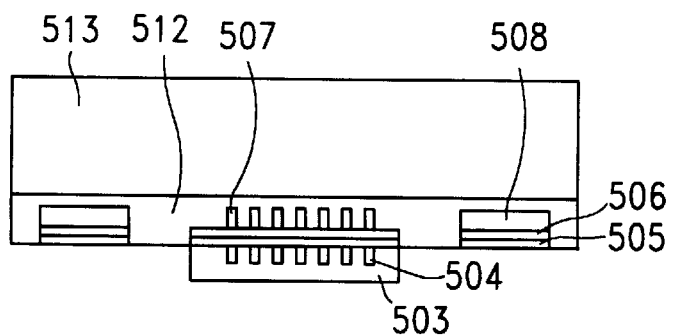
FIG. 13 is a cross-sectional view showing the n-type region separated form the silicon wafer for manufacturing a micromachined thermal flowmeter.

In FIG. 13, the wafer (501) is thinned to expose the porous silicon layer (511). The porous silicon layer (511) is removed by selective etching in a 5% NaOH solution at room temperature. since the n-type region (503) has not been converted into porous silicon, it can not be attacked by the diluted NaOH solution. The meal pads (508) also can not be attacked by the NaOH solution, because its surface is protected by the $SiO_2$ (505)/$Si_3N_4$ (506) composite layer.

Figure 14:
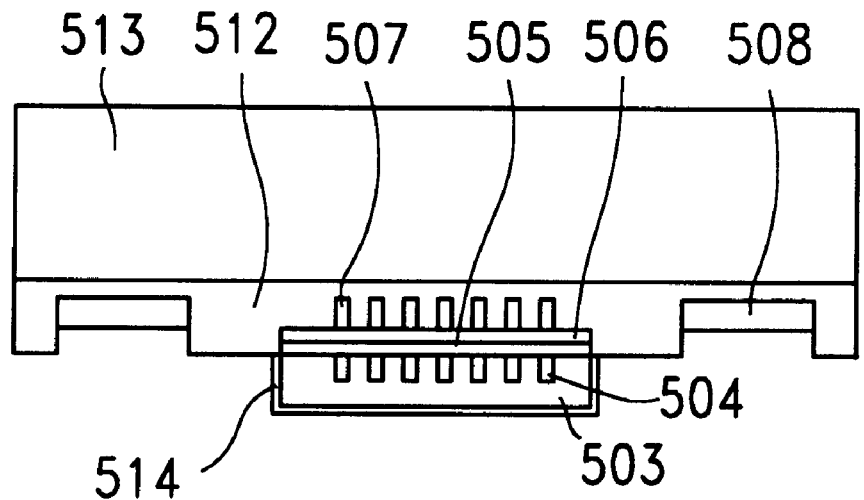
FIG. 14 is a cross-sectional view showing the n-type region coated with a $Si_3$—$N_4$ layer and two bonding pads revealed for manufacturing a micromachined thermal flowmeter.

In FIG. 14, a 1500 Å-thick $Si_3N_4$ layer (514) is formed on the surface of the n-type region (503) by CVD at 450° C. The hardnesses of $Si_3N_4$ and silicon are 3486 g/mm$^2$ and 820 g/mm$^2$, respectively. $Si_3N_4$ is much harder than silicon and preferably by used for preventing silicon from abraded out. A final photoresist process is performed to remove the $SiO_2$/$Si_3N_4$ composite layer on the metal (508).

Figure 15:
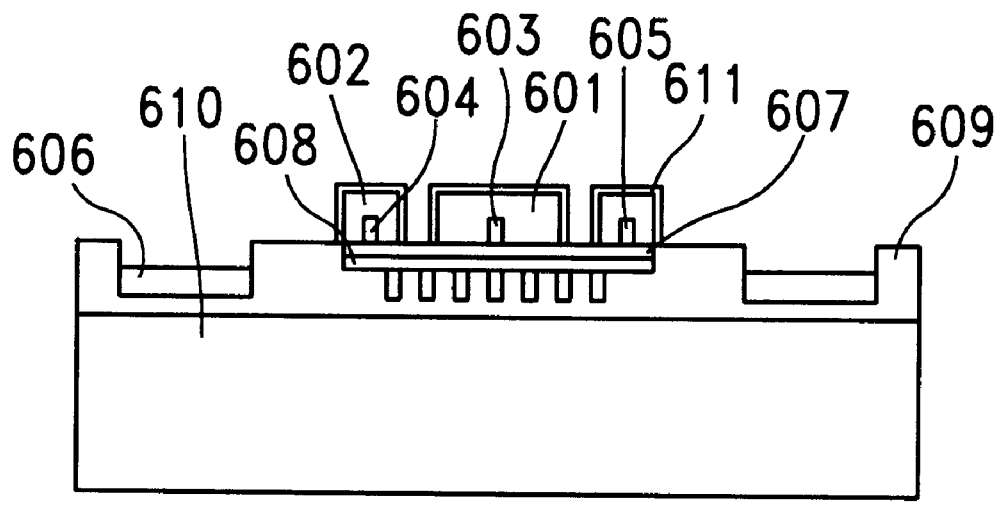
FIG. 15 is a cross-sectional view showing a second embodiment of a micromachined thermal flowmeter according to the present invention.

A second embodiment of a micromachined thermal flowmeter is shown in FIG. 15, according to the present invention, it comprises three thin single crystal silicon islands (601) and (602), a polyimide layer (609), a glass plate (610), a insulating $SiO_2$ layer (607), an insulating $Si_3N_4$ layer (608), two bonding pads (606), a heating resistor (603), two temperature sensing elements (604) and (605), and a surface protecting $Si_3N_4$ layer (611). In this embodiment, one silicon island (601) is used to form the heating resistors, two islands (602) are to form the two temperature sensing elements (604) and (605).

While the present invention has been described with reference to particular embodiments of micromachined thermal flowmeters, it is obvious that other embodiments can be used without departing from the teachings herein. Obviously, many modifications and variations are possible in light of the teaching herein. It is therefore to be understood that within the scope of the appended claims, the present invention may be practiced other than as specifically described.

What is claimed is:

1. A method of manufacturing a micromachined thermal flowmeter comprising the steps of:

providing a lightly doped p-type silicon water;

forming a lightly doped n-type region in said p-type silicon wafer;

forming a heating resistor in a central region of said n-type region;

forming two thermopiles in said n-type region which respectively consist of at least 10 aluminum/p-type silicon thermocouples asymmetrically located around said heating resistor;

forming a metallization pattern on a surface of said p-type silicon wafer for electrically connecting said heating resistor and said thermopiles to an external circuit;

forming an anodization mask on the surface of said p-type silicon wafer for preventing said n-type region and said metallization pattern from etching during an anodization process;

performing said anodization process in a concentrated HF solution selectively to form a porous silicon layer in a p-type region of said p-type silicon wafer;

forming a polyimide layer on the surface of said p-type silicon wafer;

mounting a glass plate on a surface of said polyimide layer;

thinning said p-type silicon wafer from a back side thereof to expose said porous silicon layer;

removing said porous silicon layer by selective etching in a diluted base solution to form said n-type region as a thin single crystal island;

coating an exposed surface of said thin single crystal silicon island with a corrosion-resistant and abrasion-resistant material; and stripping all insulating layers from metal pad surfaces of said metallization pattern.

2. A method of manufacturing a micromachined thermal flowmeter of claim 1 wherein said lightly doped p-type silicon wafer has a resistivity of 0.01–20 Ω-cm.

3. A method of manufacturing a micromachined thermal flowmeter of claim 1 wherein said lightly doped n-type silicon region has an average resistivity of 1–15 Ω-cm and a junction depth of 2–20 Ωm.

4. A method of manufacturing a micromachined thermal flowmeter of claim 1 wherein said porous silicon layer has a thickness of 20–150 μm.

5. A method of manufacturing a micromachined thermal flowmeter of claim 1 wherein said polyimide layer has a thickness of 3–20 μm.

6. A method of manufacturing a micromachined thermal flow meter comprising the steps of:

providing a lightly doped p-type silicon wafer;

forming a plurality of lightly doped n-type regions in said p-type silicon wafer so that one of said n-type regions is centrally located and the others are located around it;

forming a heating resistor in said central n-type region;

forming a PN junction device in each of said other n-type regions;

forming a metallization pattern for electrically connecting said heating resistor and said PN junction devices to an external circuit;

forming an anodization mask on a surface of said p-type silicon wafer for preventing said n-type regions and said metallization pattern from etching during an anodization process;

performing said anodization process in a concentrated HF solution selectively to form a porous silicon layer in a p-type region of said p-type silicon wafer;

forming a polyimide layer on the surface of said p-type silicon wafer;

mounting a glass plate on a surface of said polyimide layer;

thinning said p-type silicon wafer from a back side thereof to expose said porous silicon layer;

removing said porous silicon layer by selective etching in a diluted base solution to form said n-type regions as thin single crystal islands;

coating an exposed surface of said thin single crystal silicon islands with a corrosion-resistant and abrasion-resistant material; and stripping all insulating layers from metal pad surfaces of said metallization pattern.

7. A method of manufacturing a micromachined thermal flowmeter of claim 6 wherein said lightly doped p-type silicon wafer has a resistivity of 0.01–20 $\Omega$-cm.

8. A method of manufacturing a micromachined thermal flowmeter of claim 6 wherein said lightly doped n-type silicon regions have an average resistivity of 1–15 $\Omega$-cm and a junction depth of 2–20 $\mu$m.

9. A method of manufacturing a micromachined thermal flowmeter of claim 6 wherein said porous silicon layer has a thickness of 20–150 $\mu$m.

10. A method of manufacturing a micromachined thermal flowmeter of claim 6 wherein said polyimide layer has a thickness of 3–20 $\mu$m.

* * * * *

UNITED STATES PATENT AND TRADEMARK OFFICE
CERTIFICATE OF CORRECTION

PATENT NO. : 6,139,758
DATED : October 31, 2000
INVENTOR(S) : Xiangzheng Tu

It is certified that error appears in the above-identified patent and that said Letters Patent is hereby corrected as shown below:

Title page,
Item [73], delete the assignee name "Enlite Laboratories, Inc." and insert -- Eulite Laboratories, Inc. --

Signed and Sealed this

Sixth Day of November, 2001

Attest:

*Nicholas P. Godici*

NICHOLAS P. GODICI
*Attesting Officer*  *Acting Director of the United States Patent and Trademark Office*